United States Patent

Chamillard et al.

[15] 3,667,104

[45] June 6, 1972

[54] POSITION LOCATING APPARATUS EMPLOYING MULTIPLE PROJECTING LAMPS

[72] Inventors: George W. Chamillard, East Bridgewater; David M. Winsor, North Attelboro, both of Mass.

[73] Assignee: Teradyne, Inc., Boston, Mass.

[22] Filed: July 2, 1970

[21] Appl. No.: 51,842

[52] U.S. Cl. ..............................29/203 B, 29/203 P, 29/407, 340/282

[51] Int. Cl. ....................................H05k 13/04, B23q 17/00

[58] Field of Search..................29/203 P, 203 B, 203 R, 407; 340/282

[56] References Cited

UNITED STATES PATENTS 3,204,785 9/1965 Bajulaz ...............................214/16.1
3,372,455 3/1968 Howie.................................29/407 X
3,506,911 4/1970 Stone...............................29/203 B X
3,421,802 1/1969 Irazoqui................................312/183
3,456,817 7/1969 Irazoqui...............................214/16.4

*Primary Examiner*—Thomas H. Eager
*Attorney*—Kenway, Jenney and Hildreth

[57] ABSTRACT

Position-locating apparatus projects light from an array of lamp devices onto one or more selected locations on a support member to indicate automatically that a correspondingly-selected device is to be positioned at each illuminated location, typically for assembly onto the support member. The designation of the selected device lights a selected lamp element of the array for illuminating each position through an optical mask. Each lamp projects light over an area on the support member that partially overlaps the area which one or more other lamp elements can illuminate, but only a single lamp illuminates windows in a single unique portion of the mask.

6 Claims, 3 Drawing Figures

INVENTORS
GEORGE W. CHAMILLARD
DAVID M. WINSOR
BY
Kenway, Jenney & Hildreth
ATTORNEYS

INVENTORS
GEORGE W. CHAMILLARD
DAVID M. WINSOR

BY
Kenway, Jenney & Hildreth
ATTORNEYS

POSITION LOCATING APPARATUS EMPLOYING MULTIPLE PROJECTING LAMPS

BACKGROUND OF THE INVENTION

This invention relates to equipment for indicating the location on a support member at which a device is to be assembled, or positioned for some other purpose. The invention is particularly useful in the assembly of electrical components, which term includes assemblies thereof, onto printed circuit boards and it is described here with reference to this illustrative use.

Printed circuit boards are typically manufactured by assembling the electrical components on the board, individually and manually, and then soldering all or a group of the components to the conductors on the board at once. The assembly of the components onto the board involves selecting each component, determining the location where it is to be placed, and inserting the component leads into preformed holes through the board at that location.

Component position locators are known that deliver the components to the assembler in separate bins of an incrementing, multi-bin conveyor and that illuminate the circuit board location at which the component in a bin at a "home position" is to be inserted. The illumination of locations on the printed circuit board can be either from below the board or from above the board, which is the side from which the components are inserted. When illuminated from below, the illumination is visible to the assembler both through the preformed holes in the printed circuit board and, to a lesser degree, through the printed circuit board itself, for they conventionally are translucent.

One prior known machine of this type employs a single lamp that moves with the incrementing of the conveyor to illuminate the desired printed circuit board location. Another prior machine employs an optical mask between the lamp and board and which moves to aim the illumination to the desired location. These prior position locators require relatively complex carriage mechanisms for moving the lamp or mask with the requisite precision. Also, they generally illuminate only a single location at a time, even though it is common for a circuit board to have a number of identical components assembled thereon at different locations.

Another prior component position locator has multiple fiber-optic light pipes arranged in a two-dimensional array such that illumination of a single light pipe, or a group thereof, indicates the position at which a component is to be assembled. This machine can illuminate several component locations at once. However, only a single light pipe illuminates any given spot on the printed circuit board. Consequently, this prior position locator, requires an inordinately large number of light pipes, and a correspondingly large number of pipe-illuminating lamps, to enable any spot on the board to be illuminated.

Also, to minimize the dispersion of the light exiting from the output facet of each light pipe, the printed circuit board is disposed closely adjacent the facets of the pipes. This is often undesirable because it allows no space for the leads of assembled components to protrude beyond the underside of the printed circuit board, as is often desired until the components are soldered in place. Instead, use of this machine requires that the component leads be uniformly trimmed prior to insertion into the circuit board.

Accordingly, it is an object of this invention to provide improved position locating equipment free of aimed lamps, masks and the like.

It is also an object to provide automatic position locating equipment having a stationary illuminating structure and which projects the locating illumination a significant distance to the printed circuit board or support member with only selected and uniform dispersion.

A further object of the invention is to provide automatic position locating equipment of the above character for identifying a plurality of locations with a number of lamp devices that is small relative to the number of possible locations.

Other objects of the invention will in part be obvious and will in part appear hereinafter.

SUMMARY OF THE INVENTION

Position locating equipment embodying the invention employs a stationary array of lamp elements, each of which projects light onto a viewing surface at which a printed circuit board or other device-receiving support member is mounted. An optical mask is interposed between the lamp array and the viewing surface. The mask is optically opaque to block illumination from the viewing surface except at windows located in optical alignment with device-receiving locations at the viewing surface.

Each lamp element projects light onto a single unique portion of the mask, but can illuminate a section of the viewing surface that overlaps one or more sections which another lamp element can illuminate. This arrangement enables one of two or more lamps to illuminate the location on a printed circuit board at which a particular component is to be mounted. As a result, a relatively small number of lamps and a single mask can illuminate the locations for assembling each of a number of different components without ambiguity. Also, the equipment illuminates plural locations for assembly of plural identical components at the same time.

The invention accordingly comprises the features of construction, combination of elements, and arrangement of parts exemplified in the construction hereinafter set forth, and the scope of the invention is indicated in the claims.

BRIEF DESCRIPTION OF DRAWINGS

For a fuller understanding of the nature and objects of the invention, reference should be had to the following detailed description taken in connection with the accompanying drawings in which.

DESCRIPTION OF ILLUSTRATED EMBODIMENT

Figure 1:
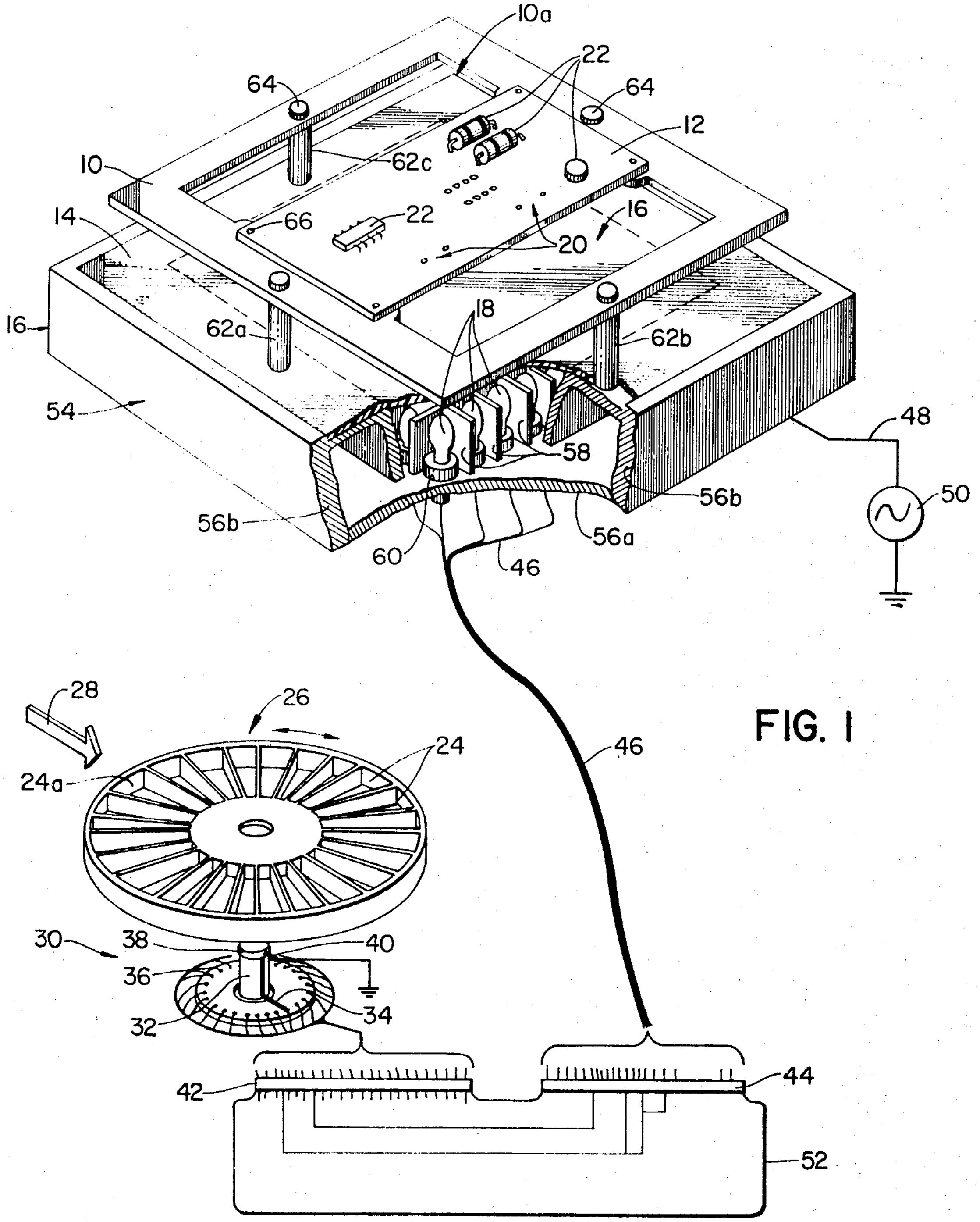
FIG. 1 shows a component position locating machine, partly in pictorial form and partly in schematic form, embodying features of the invention.

With reference to FIG. 1, a locator for use in assembling components on a printed circuit board in the manufacture thereof has a mounting jig 10 that mounts a printed circuit board 12 at a viewing surface above an optical mask 14. An array 16 of bulbs 18 illuminates selected component locations, such as two locations 20—20 on the board 12 thorough optical windows in the mask.

Several components 22 are shown already mounted on the printed circuit board 12 with their leads inserted through preformed holes in the board. The assembler obtained different ones of these components from different bins 24 of a rotatable parts tray 26. When the assembler turns the tray to position bin **24*a* at home position 28, a switching selection network indicated generally at 30 and coupled with the tray shaft 32 lights the one or more lamps that illuminate each position 20 at which a component in the bin 24*a*** is to be assembled.

The assembler inserts the leads of a component from bin **24*a* into the holes at each illuminated location 20. Thereafter, the assembler turns the tray 26 to position the next bin 24 at the home position 28, and the locator illuminates automatically the one or more locations on the board 12** at which components from this bin are to be assembled.

With further reference to FIG. 1, the multi-bin tray 26 is mounted on shaft 32 and the shaft is mounted for rotation to position any bin 24 at the home position 28. The shaft carries an electrical wiper arm 34 that makes electrical connection with a different fixed contact 36 as different bins 24 are moved to the home position. A contact band 38, connected with the arm 34 and carried on the shaft, makes sliding electrical contact with a brush contact 40 that is connected to ground or another return conductor.

These electrical switch elements associated with the parts tray 26 are part of the switching selection network 30. The network 30 also includes a multi-contact connector receptacle 42, each contact of which is connected to a different one of the fixed contacts 36. There is thus a separate fixed contact 36 and a separate contact in connector receptacle 42 for each component-containing bin 24 on the tray.

Another multi-contact receptacle 44 has at least as many contacts as there are lamps 18 in the lighting array 16, and a multi-conductor cable 46 connects one terminal of each lamp 18 to a different contact of the receptacle 44. The other terminal of each lamp 18 is connected to a common conductor 48 which in turn is connected to one side of an electrical lamp source 50, the other side of which is connected to the ground return conductor.

With further reference to FIG. 1, a circuit board 52 plugs in to the two connector receptacles 42 and 44 and carries printed circuit or other conductors that connect each contact of receptacle 42 to one or more different contacts of receptacle 44. That is, the circuit board 52 interconnects the connector receptacles 42 and 44 so as to connect each fixed contact 36 associated with the tray 26 with the lighting array 16. The connection is such that each location-indicating lamp of the lighting array is connected at most with only a single fixed contact 36. The reason each position-indicating lamp is connected with only a single fixed contact 36 is to avoid ambiguity as to the location on the printed circuit board 12 where a component selected from the tray 26 is to be assembled.

However, the lighting array 16 can also include lamps 18 that light up instructions for the assembler in addition to the lamps that illuminate locations on the printed circuit board. For this purpose, sections of the mask 14 that do not correspond to component-receiving locations on the printed circuit board can carry instructional messages, such as an instruction to the assembler to take no components from a certain bin, or identifying the first bin or last bin from which components are to be selected on a particular tray. The lamps illuminating such instructional portions of the mask can be connected with more than one fixed contact 36.

The illustrated lighting array 16 has a box-like support base 54 having a lamp-positioning bottom wall 56*a* and rectangular peripheral walls 56*b*. A rectangular grid of partitions 58 forms a two-dimensional array of rectangular cubicles within the base. A lamp socket 60 is secured in each cubicle and a lamp 18 is seated therein. The base 54 also carries mounting posts 62; the illustrated base has four such posts 62*a*, 62*b*, 62*c* and 62*d*, each of which protrudes upward from one peripheral wall 56*b*. Each post has a short upper portion 64 of reduced diameter.

The mask 14 rests essentially directly onto the cubicle-forming partitions of base 54. The mask has aligning holes therethrough that receive the posts 62 to position the mask with respect to the cubicles. This ensures that a specified lamp 18 illuminates a known portion of the mask. The mask, which usually overlays all of the cubicles, is optically opaque except that it has light-transmitting windows optically aligned to project light from the lamp therebelow onto a specified location on the underside of the printed circuit board.

The illustrated mounting jig 10 is a frame defining a central opening 10*a*. The frame seats onto the base 54, with the requisite alignment by way of the post upper portions 64 passing through aligning holes in the frame. The frame in turn carries aligning pins 66 along the periphery of the opening 10*a*. The printed circuit board 12 seats onto the mounting jig frame, spanning the central opening 10*a* and with aligning holes therein seated onto the pins 66. The shoulders formed on the mounting posts 62 at the base of the upper portions 64 thereof maintain the mounting jig frame at a desired viewing surface, ie. at a fixed distance above the lamps 18 and mask 14. Hence with this assembly, the printed circuit board 12 is secured a known fixed distance above the mask 14 and in specified registration with it.

With the foregoing arrangement of the position locator, the mask 14 is laid out such that a different group of one or more lamps 18 illuminates the group of one or more locations, on the printed circuit board 12 to be assembled by means of that mask, for each kind of component. A single lamp 18 can illuminate several locations, within the field of illumination of that lamp, on the board 12 that receive the same kind of component, i.e. components from the same bin of the tray 26. But different lamps 18 should be used to illuminate locations on the board that receive different components. After the mask is thus laid out, the tray bins 24 are assigned specific components that are to be assembled on the board 12, and the plug-in circuit board 52 is constructed to provide the necessary connections between each fixed contact 36 and the one or more lamps needed to illuminate the mask areas that will light up the printed circuit board locations that will receive the assigned component.

Once the mask 14, plug-in circuit board 52, and tray 26 are arranged in this manner for a particular circuit board 12, they are used repetitively for the manufacture of the particular printed circuit board 12.

The requirement that each lamp 18 illuminate only the location for assembling components from one bin, for unambiguous assembly, has conventionally been considered to require that there be a separate lamp for each possible component location on a printed circuit board. Thus where a locator is to be used for assembling a variety of printed circuit boards, this premise would conventionally require that there be a multitude of individual lamp elements, each of which illuminates a unique separate portion of the printed circuit board.

The present position locator, however, attains the single lamp per component type requirement with a relatively small number of lamps. The invention attains this economy by arranging each lamp to illuminate an area on the printed circuit board 12 which overlaps in part the area which at least one other lamp can illuminate. By this arrangement, where two lamps can illuminate the same area on the printed circuit board, either of these lamps can be used to illuminate a component location in the area of their overlapping illuminations. The mask window for a component location in this area of overlap is disposed over one or the other of the lamps, whichever is available for illuminating that location.

Figure 2:
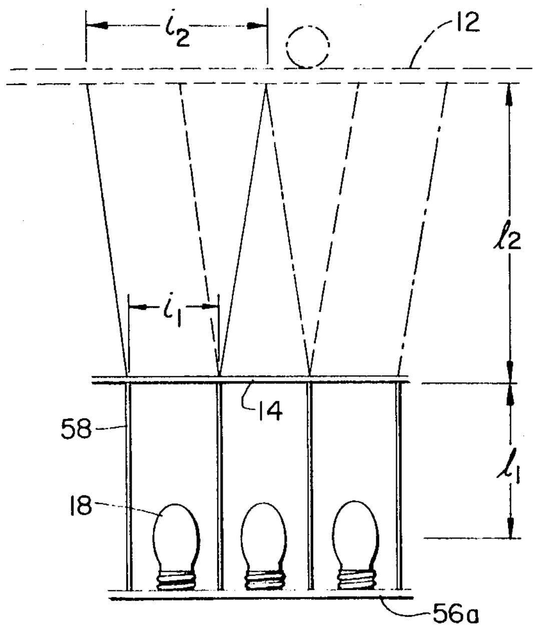
FIG. 2 is a fragmentary simplified side elevation view showing the lamp element array and mask and viewing surface of the locator of FIG. 1.
Figure 3:
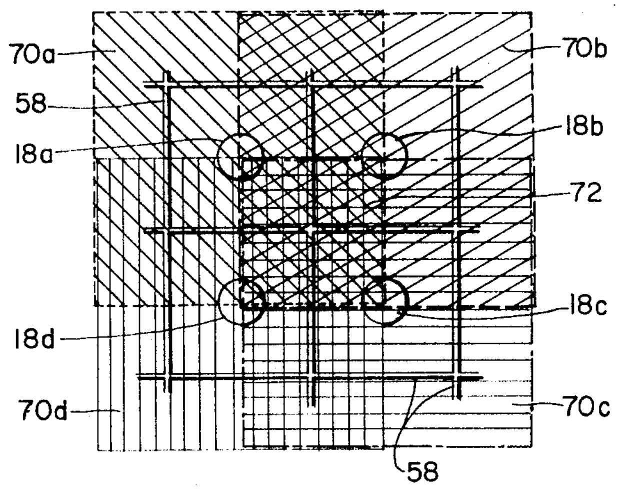
FIG. 3 is a schematic plan view of the optical arrangement of the lamps in the array of the FIG. 1 locator.

FIGS. 2 and 3 show an arrangement of the locator in accordance with the invention wherein any one of four lamps can be used to illuminate a component location on the printed circuit board 12 of FIG. 1. FIG. 3 shows four lamps 18*a*, 18*b*, 18*c* and 18*d* of such an array. Lamp 18*a* illuminates a field 70 a at the viewing surface, and the illumination fields of the other three lamps are 70*b*, 70*c*, and 70*d* respectively. Each illumination field of this illustrated lamp array overlaps one-half of four other illumination fields and one-quarter of an additional four other fields.

From this perspective plan view FIG. 3 it will be seen that a mask window aligned between any one of the four lamps and the viewing surface section 72, where the four illumination fields overlap, can illuminate a location anywhere in this section 72 of the viewing surface.

Similarly, in those sections of the viewing surface where only two of the four illumination fields overlap, any one of the two lamps involved can be used to indicate a component location.

FIG. 2, a simplified elevation view of the lighting array 16 with the mask 14 and viewing surface at which printed circuit board 12 is supported, indicates the geometrical arrange-ment of these elements. Assuming each lamp 18 to be a point source of light, the general relation between the dimensions shown to provide the desired illumination of the same section of viewing surface by the desired number of lamps is $$i_1/i_2 = 1_1/1_2$$

where $i_1$ is the width of the cubicle opening;

$i_2$ is the width of the illumination field at the viewing surface from a single lamp as measured along the same direction as $i_1$;

$l_1$ is the distance between the center of illumination of the lamp and the mask, i.e. the outer end of the cubicle in which the lamp is seated; and $l_2$ is the distance between the mask and the viewing surface.

From the foregoing equation it will be seen that, to provide the illumination arrangement shown in FIG. 3 where $i_2$ is two times $i_1$, the distance $l_2$ is two times the distance $l_1$. It should be noted that this distance $l_2$ between the printed circuit board and the mask, provides ample space for the leads of components assembled on the printed circuit board to protrude below the board. This is advantageous where the board is being assembled with components having untrimmed leads, and the leads of at least a group of the components are trimmed in one single operation after they are all assembled.

The invention thus provides an automatic position locator that provides ambiguity-free indication of locations with a minimal number of lamp devices. Moreover, each indicated location can be of essentially any size, and plural locations close to each other can be indicated at different times. The locator thus facilitates error-free assembly of devices on a support member by relatively unskilled assemblers. Further, the locator is readily constructed at low cost.

It will thus be seen that the object set forth above, among those made apparent from the preceding description, are efficiently attained. Since certain changes may be made in the above construction without departing from the scope of the invention, it is intended that all matter contained in the above description or shown in the accompanying drawings shall be interpreted as illustrative rather than in a limiting sense.

Further, the locator can employ a mask having clear windows and also having selectively colored windows to illuminate locations with selected coloring that imparts further information to the assembler. By way of example, the mask can have windows colored to illuminate printed circuit board locations that receive diodes with different colors to identify the orientation with which the diode is to be assembled. The coloring thus instructs the assembler how to insert the diode for the correct polarity connections.

It is also to be understood that the following claims are intended to cover all the generic and specific features herein described and all statements of the scope of the invention which, as a matter of language, might be said to fall therebetween.

Having described the invention, what is claimed as new and secured by Letters Patent is:

1. Apparatus for indicating the location on a support member at which each of plural devices is to be positioned, said apparatus having mounting means for holding a device-receiving support member disposed at a viewing surface, device selecting means for indicating a device to be positioned on a support member at said viewing surface and producing a signal corresponding to said indication, and indicating means for illuminating a location on the support member disposed at said viewing surface at which the indicated device is to be positioned, said indicating means comprising A. a plurality of light-projecting lamp means disposed in an array spaced from said viewing surface and each arranged to illuminate different sections of said viewing surface, B. an optical mask disposed between said arrayed lamp means and said viewing surface in optical alignment with the light which said lamp means project onto said viewing surface and having a pattern of optical windows geometrically corresponding to the pattern of support-member locations at which different devices are to be positioned, and C. lamp energizing means responding to said device indicating signal for lighting only lamp means that project illumination onto windows of said mask corresponding to support-member locations at which the designated device is to be positioned.

2. Location indicating apparatus as defined in claim 1 further characterized in that said arrayed lamp means and said mask are optionally aligned such that each of a plurality of said lamp means illuminates a section of said viewing surface that overlaps in part at least the viewing surface section which one other lamp means illuminates.

3. Location indicating apparatus as defined in claim 2 further characterized in that said arrayed lamp means and said mask are optically aligned such that each lamp means illuminates only a single section of said mask.

4. Location indicating apparatus as defined in claim 1 in which

A. said arrayed lamp means and said mask are optically aligned such that each lamp means illuminates not more than a single section of said mask, and B. said lamp means, mask and mounting means are disposed such that $$i_1/i_2 = l_1/l_2$$

where $i_1$ is the width of a section of said mask which a single lamp means illuminates, $i_2$ is the width, measured along the same direction as $i_1$, of a section of said viewing surface which a single lamp means can illuminate, $l_1$ is the spacing between the center of illumination of each lamp means and said mask, and $l_2$ is the spacing between said mask and said viewing surface.

5. Location-indicating apparatus as defined in claim 1 in which

A. each section of said mask receives illumination from not more than a single one of said arrayed lamp means, B. each of at least a group of said arrayed lamp means is disposed relative to said mounting means to illuminate a section of said viewing surface which overlaps other sections which others of said lamp means illuminate, and C. said energizing means is arranged to light different lamp means in response to different indicating signals.

6. Circuit assembly apparatus for illuminating the individual locations on a circuit board at which each of plural circuit components is to be assembled, said apparatus comprising A. support means for removably supporting a circuit card in a selected alignment at a viewing surface, B. an array of plural light-projecting lamp means mounted relative to said support means to be in optical alignment with said viewing surface, and each lamp means of which can illuminate a section of said viewing plane which partially overlaps at least one other such section, C. an optical mask 1. disposed in optical alignment with the light said lamp means project onto said viewing surface, 2. arranged to receive illumination at any point thereon from not more than one of said arrayed lamp means, and 3. associated with a circuit board to be assembled therewith and having optical windows geometrically arranged in a pattern corresponding to the pattern of locations at which components are to be assembled on the associated circuit board, and D. lamp selection means 1. for receiving an indication of a component to be assembled on the circuit board at said viewing surface, and 2. responding to said indication to energize the selected ones of said lamp means which illuminate only those mask windows associated with locations at which the indicated component is to be assembled.

* * * * *